United States Patent
Haase et al.

(10) Patent No.: US 6,374,755 B1
(45) Date of Patent: Apr. 23, 2002

(54) LAYER CAKE SUPPORTING DEVICE

(76) Inventors: Vern A. Haase; Arlene M. Haase, both of 42551 299th St., Scotland, SD (US) 57059-5705

( * ) Notice: Subject to any disclaimer, the term of this patent is extended or adjusted under 35 U.S.C. 154(b) by 0 days.

(21) Appl. No.: 09/586,020

(22) Filed: Jun. 2, 2000

(51) Int. Cl.[7] ............................................... A47B 57/00
(52) U.S. Cl. ........................ 108/101; 108/158; 108/183
(58) Field of Search ............................. 108/91, 92, 93, 108/96, 107, 183, 186, 157.17, 158; 248/146, 158; 211/133.1, 126.7, 135, 126.11, 126.12, 126.14, 128.1, 130.1

(56) References Cited

U.S. PATENT DOCUMENTS

| | | | |
|---|---|---|---|
| 816,053 A | * | 3/1906 | Wittbold ...................... 108/92 |
| 1,619,818 A | | 3/1927 | Gowans |
| 2,178,166 A | | 10/1939 | Enstrom |
| 2,347,041 A | * | 4/1944 | Filsinger .............. 211/133.1 X |
| 2,902,174 A | * | 9/1959 | Audsley ...................... 108/101 |
| 2,921,691 A | | 1/1960 | Dembinski |
| 2,973,871 A | * | 3/1961 | Wukowitz .................. 108/101 |
| 3,070,236 A | | 12/1962 | MacPherson, Sr. |
| 3,115,253 A | * | 12/1963 | Malbin et al. ........... 211/128.1 |
| 3,236,389 A | | 2/1966 | Murdock |
| 3,690,610 A | * | 9/1972 | Peirce .................... 108/101 X |
| 3,814,032 A | | 6/1974 | McMains |
| 3,951,079 A | * | 4/1976 | Tolleson ...................... 108/94 |
| 4,032,097 A | * | 6/1977 | Dwyer ....................... 248/146 |
| 4,069,772 A | | 1/1978 | Haapala |
| 4,101,232 A | | 7/1978 | Haapala |
| 4,534,474 A | * | 8/1985 | Ng ............................... 211/70 |
| 5,165,637 A | | 11/1992 | Polley et al. |
| 5,617,798 A | * | 4/1997 | Lytell ....................... 108/96 X |
| D413,046 S | | 8/1999 | Fritze |
| 6,237,881 B1 | * | 5/2001 | Levesque .................... 248/146 |

* cited by examiner

*Primary Examiner*—Anthony D. Barfield
*Assistant Examiner*—Hanh V. Tran

(57) ABSTRACT

A layer cake supporting device for allowing multiple layers of cake to be vertically stacked upon each other includes a plurality of plates. Each of the plates has a peripheral edge, a top side and a bottom side. The plates each have a hole therein defined by a perimeter edge. Each of the holes extends through the top and bottom sides. Each of the peripheral edges has a different size. Each of the perimeter edges of the plates has a length substantially equal to one of the peripheral edges of another of the plates. A plurality of legs each is removably attached to a bottom side of the plates. The legs may be pressed through a top surface of the cake such that the bottom side of the plate rests on the top surface of the cake, and another layer of cake may be placed on the plate.

11 Claims, 4 Drawing Sheets

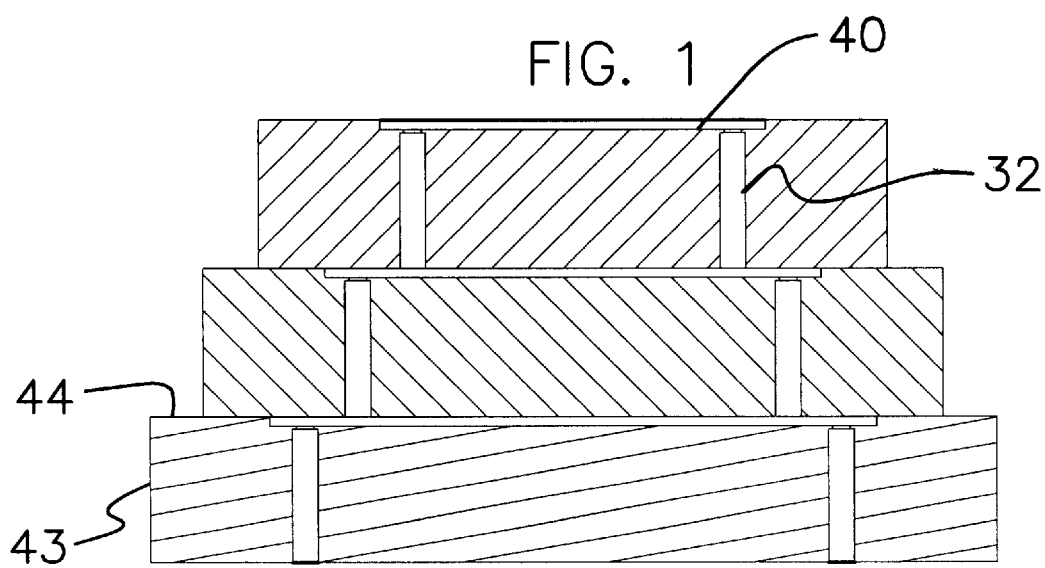
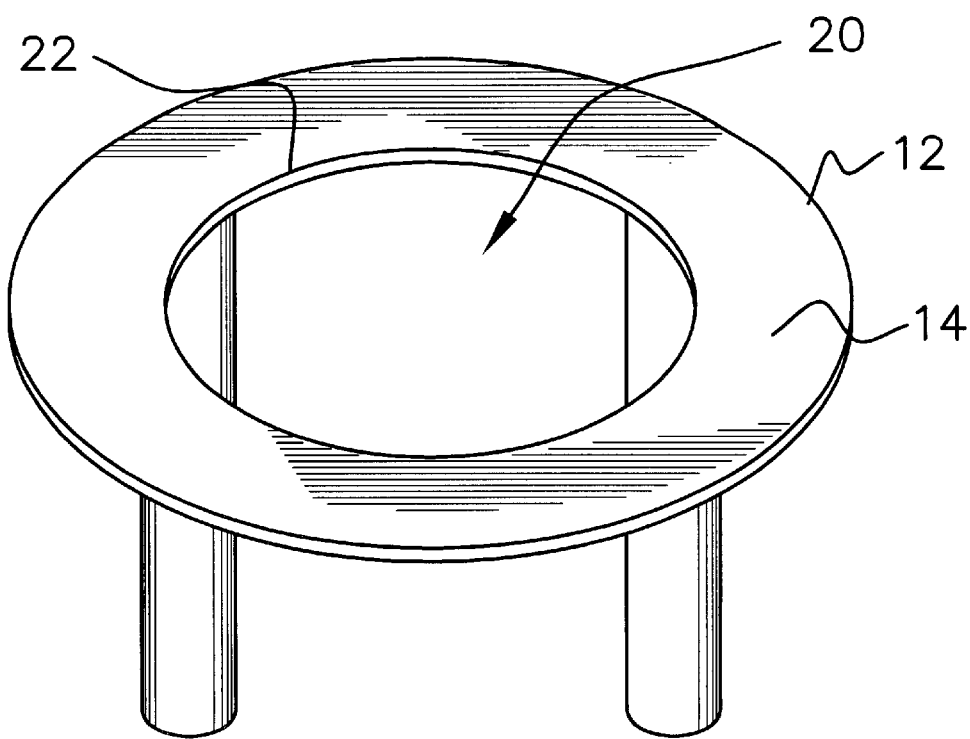

LAYER CAKE SUPPORTING DEVICE

BACKGROUND OF THE INVENTION

1. Field of the Invention

The present invention relates to cake supporting systems and more particularly pertains to a new layer cake supporting device for allowing multiple layers of cake to be vertically stacked upon each other.

2. Description of the Prior Art

The use of cake supporting systems is known in the prior art. More specifically, cake supporting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,178,166; U.S. Pat. No. 3,070,236; U.S. Pat. No. 3,814,032; U.S. Pat. No. 2,921,691; U.S. Pat. No. 5,165,637; U.S. Pat. No. 4,069,772; U.S. Pat. No. 3,236,389; U.S. Pat. No. 1,619,818; U.S. Des. Pat. No. 413,046; and U.S. Pat. No. 4,101,232.

While these devices fulfill their respective, particular objectives and requirements, the aforementioned patents do not disclose a new layer cake supporting device. The inventive device includes a plurality of plates. Each of the plates has relatively planar top side and a relatively planar bottom side. Each of the plates has a peripheral edge. The plates each have a hole therein extending through the top and bottom sides. The holes have a perimeter edge. Each of the plurality of plates has a different size such that each of the plates has a perimeter edge length substantially equal to a peripheral edge of another of the plates. Each of a plurality of upstanding members is elongate and has first end, a second end and a peripheral wall extending between the first and second ends. Each of the plates has a plurality of the first ends of the upstanding members integrally coupled thereto. Each of a plurality of legs has a distal end and a proximal end. Each of the proximal ends has a bore therein. The bores have a size adapted for removably receiving one of the upstanding members.

In these respects, the layer cake supporting device according to the present invention substantially departs from the conventional concepts and designs of the prior art, and in so doing provides an apparatus primarily developed for the purpose of allowing multiple layers of cake to be vertically stacked upon each other.

SUMMARY OF THE INVENTION

In view of the foregoing disadvantages inherent in the known types of cake supporting systems now present in the prior art, the present invention provides a new layer cake supporting device construction wherein the same can be utilized for allowing multiple layers of cake to be vertically stacked upon each other.

The general purpose of the present invention, which will be described subsequently in greater detail, is to provide a new layer cake supporting device apparatus and method which has many of the advantages of the cake supporting systems mentioned heretofore and many novel features that result in a new layer cake supporting device which is not anticipated, rendered obvious, suggested, or even implied by any of the prior art cake supporting systems, either alone or in any combination thereof.

To attain this, the present invention generally comprises a plurality of plates. Each of the plates has relatively planar top side and a relatively planar bottom side. Each of the plates has a peripheral edge. The plates each have a hole therein extending through the top and bottom sides. The holes have a perimeter edge. Each of the plurality of plates has a different size such that each of the plates has a perimeter edge length substantially equal to a peripheral edge of another of the plates. Each of a plurality of upstanding members is elongate and has first end, a second end and a peripheral wall extending between the first and second ends. Each of the plates has a plurality of the first ends of the upstanding members integrally coupled thereto. Each of a plurality of legs has a distal end and a proximal end. Each of the proximal ends has a bore therein. The bores have a size adapted for removably receiving one of the upstanding members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new layer cake supporting device apparatus and method which has many of the advantages of the cake supporting systems mentioned heretofore and many novel features that result in a new layer cake supporting device which is not anticipated, rendered obvious, suggested, or even implied by any of the prior art cake supporting systems, either alone or in any combination thereof.

It is another object of the present invention to provide a new layer cake supporting device which may be easily and efficiently manufactured and marketed.

It is a further object of the present invention to provide a new layer cake supporting device which is of a durable and reliable construction.

An even further object of the present invention is to provide a new layer cake supporting device which is susceptible of a low cost of manufacture with regard to both materials and labor, and which accordingly is then susceptible of low prices of sale to the consuming public, thereby making such layer cake supporting device economically available to the buying public.

Still yet another object of the present invention is to provide a new layer cake supporting device which provides in the apparatuses and methods of the prior art some of the advantages thereof, while simultaneously overcoming some of the disadvantages normally associated therewith.

Still another object of the present invention is to provide a new layer cake supporting device for allowing multiple layers of cake to be vertically stacked upon each other.

Yet another object of the present invention is to provide a new layer cake supporting device which includes a plurality of plates. Each of the plates has relatively planar top side and a relatively planar bottom side. Each of the plates has a peripheral edge. The plates each have a hole therein extending through the top and bottom sides. The holes have a perimeter edge. Each of the plurality of plates has a different size such that each of the plates has a perimeter edge length substantially equal to a peripheral edge of another of the plates. Each of a plurality of upstanding members is elongate and has first end, a second end and a peripheral wall extending between the first and second ends. Each of the plates has a plurality of the first ends of the upstanding members integrally coupled thereto. Each of a plurality of legs has a distal end and a proximal end. Each of the proximal ends has a bore therein. The bores have a size adapted for removably receiving one of the upstanding members.

Still yet another object of the present invention is to provide a new layer cake supporting device that allows the frosting from the top side of a layer of cake to travel into the hole of the plate so that air pockets within the cake are not forced out the side of the cake.

Even still another object of the present invention is to provide a new layer cake supporting device that has plates having holes therein to significantly lessen the weight of cake which may be several layers tall.

Still another object of the present invention is to provide a new layer cake supporting device that has plates having holes therein so that the plates are easier to remove from the cake layer and stick to less frosting which is on the layer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side cross-sectional view of a new layer cake supporting device according to the present invention.

FIG. 2 is a schematic top perspective view of the present invention.

DESCRIPTION OF THE PREFERRED EMBODIMENT

Figure 3:
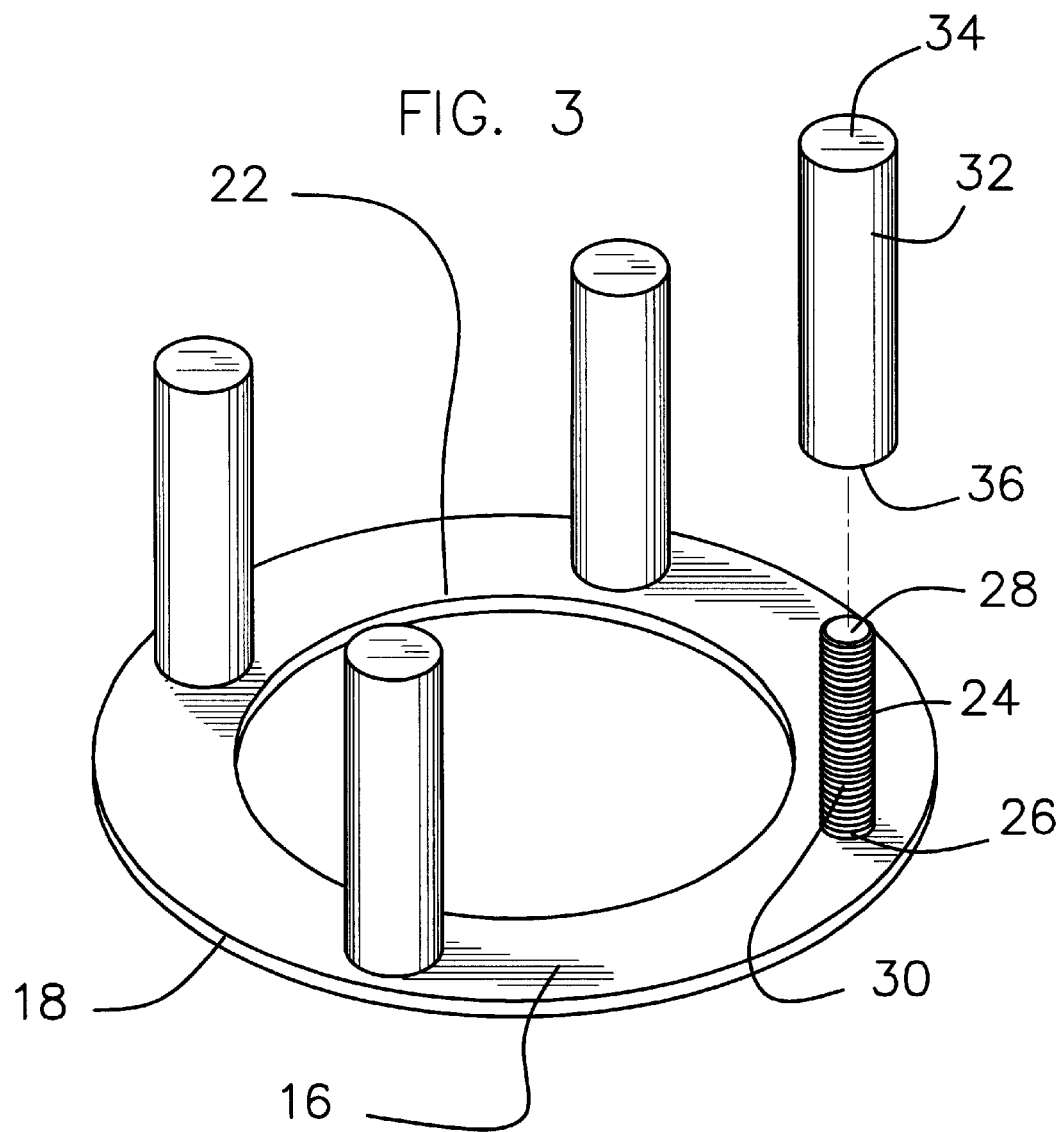
FIG. 3 is a schematic bottom perspective view of the present invention.
Figure 4:
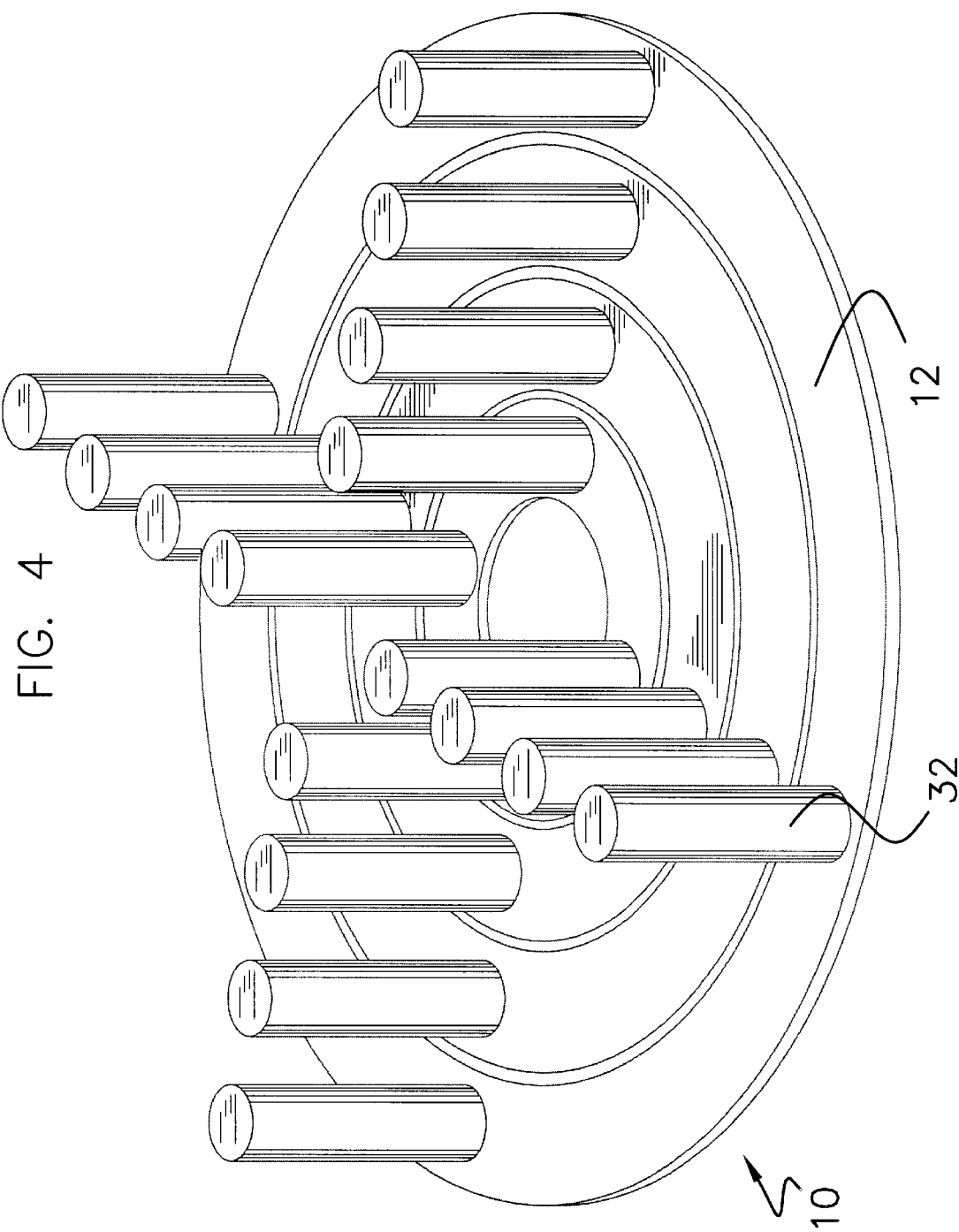
FIG. 4 is a schematic bottom perspective view of multiple plates of the present invention.
Figure 5:
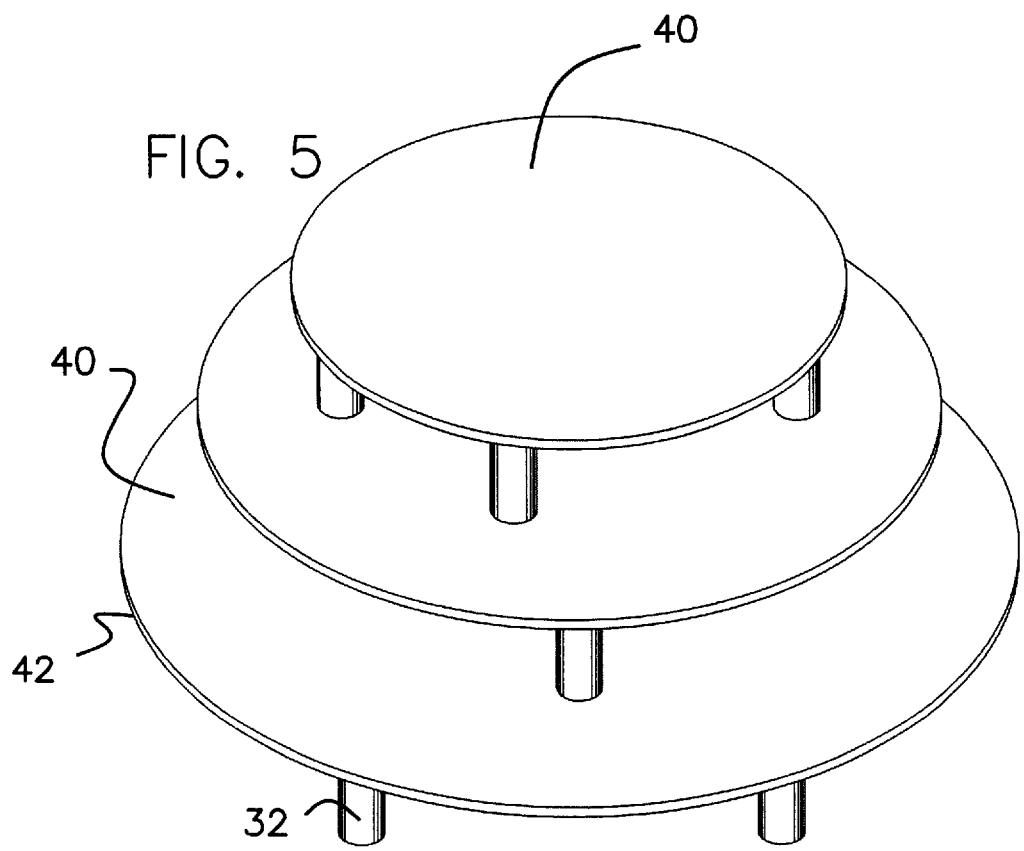
FIG. 5 is a schematic perspective view of the plates having panels thereon of the present invention.
Figure 6:
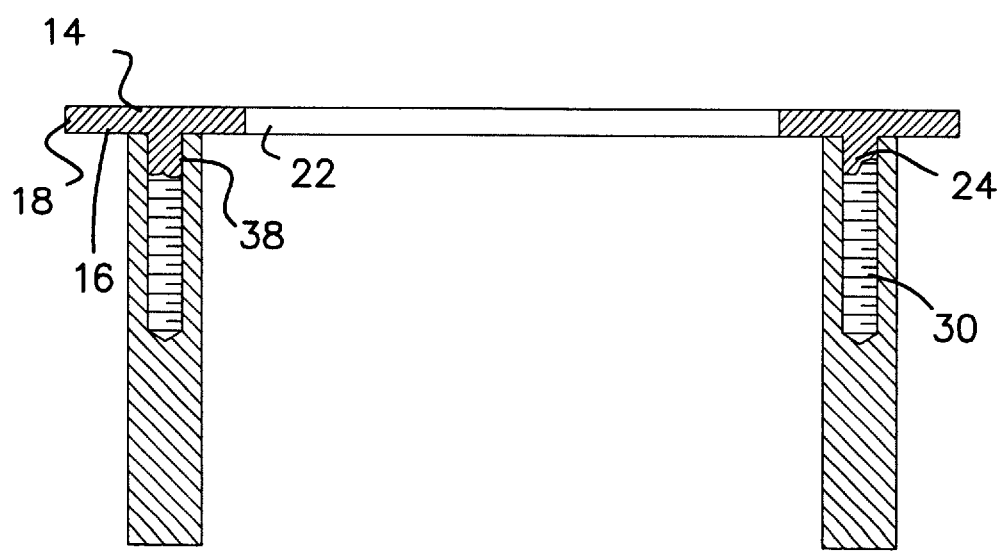
FIG. 6 is a schematic cross-sectional view of a plate, upstanding member and legs of the present invention.

With reference now to the drawings, and in particular to FIGS. 1 through 6 thereof, a new layer cake supporting device embodying the principles and concepts of the present invention and generally designated by the reference numeral 10 will be described.

As best illustrated in FIGS. 1 through 6, the layer cake supporting device 10 generally comprises a plurality of plates 12. Each of the plates 12 has relatively planar top side 14 and a relatively planar bottom side 16. Each of the plates has a peripheral edge 18. Each of the plates has a hole 20 therein that extends through the top 14 and bottom 16 sides. The holes 20 each have a perimeter edge 22 having a length greater than at least ½ of a length of the peripheral edge 18. Each of the plurality of plates 12 has a different size such that each of the plates 12 has a perimeter edge 22 length substantially equal to a peripheral edge 18 of another of the plates 12. Preferably, the distance between the perimeter edge 22 and the peripheral edge 18 is between ½ inches and 2 inches and is ideally equal to 1 inch. The peripheral edges 18 preferably have a height less than ¾ inches and ideally have a height less than ⅜ inches. Each of the peripheral edges 18 and the perimeter edges 22 preferably have a generally round shape. Each of the plates 12 comprises a metal. The metal is preferably stainless steel. The length and width of the plates should have measurements at least within 50% of each other.

Each of a plurality of upstanding members 24 is elongate and has first end 24, a second end 26 and a peripheral wall 30 extending between the first 24 and second 26 ends. Each of the plates 12 has a plurality of the first ends 24 of the upstanding members 24 integrally coupled thereto. The upstanding members 24 are spaced from each other and are preferably orientated generally perpendicular to a plane of the bottom sides 16 of the plates 12. Each of the peripheral walls 30 has a threaded surface. Ideally, each of the plates 12 has four of the upstanding members 24 coupled thereto. The upstanding members 24 are preferably comprised of a metal.

A plurality of legs 32 each has a distal end 34 and a proximal end 36. Each of the proximal ends 36 has a bore 38 therein. Each of the bores 38 has a size adapted for removably receiving one of the upstanding members 24. Each of the bores 38 has a threaded surface adapted for removably coupling with the threaded surface of the upstanding members 24 such that length between the plates 12 and distal end 34 of the legs 32 may be selectively extended. There is a leg 32 for each of the upstanding members 24. The legs 32 each preferably comprise a plastic though metal may be used. The legs 32 preferably come in a multiple number of lengths adapted for varying depths of cakes.

A plurality of panels 40 is each comprised of a substantially rigid material. The panels 40 each have a peripheral edge 42 having a shape generally identical to a shape of a corresponding plate 12. The peripheral edges 42 of the panels 40 have a length greater than a length of the peripheral edges 18 of the corresponding plate 12. Each of the panels 40 has a different size such that each of the panels has a corresponding plate 12. The panels 40 have a perimeter length greater than the corresponding plates 12. The greater size of the panels allows them to overlap and extend beyond the peripheral edges 18 of the corresponding plates 12 when the panels 40 are placed upon their corresponding plates 12. Each of the panels 40 preferably comprises a plastic.

In use, the legs 32 may be pressed through a top surface 44 of the cake layer 43 such that the bottom side 16 of the plate 12 rests on the top surface 44 of the cake 43. A panel 40 may be placed on the top side 14 of the plate 12 such that another layer of cake 43 may be placed on the panel 40. The legs 32 attached to the next plate 12 are pressed through the second layer of cake until they rest on the panel 40, or, if no panel is used and the plates are the same size, on the plate 12 below. In this manner, many layers of cake may be stacked upon each other. The frosting on the top of the cake is allowed to move up into the hole 20 of the plate 12. This prevents the plate 12 from pressing down on the cake 43 which causes air bubbles in the cake 43 to escape the cake on its side and distort the frosting. The upstanding members 24 may selectively be turned into the legs 32 so that legs 32 are different lengths away from the plate 12 to accommodate variations in cake thickness.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A layer cake supporting device for vertically supporting layers of cake, said device comprising:
    a plurality of plates, each of said plates having relatively a planar top side and a relatively planar bottom side, each of said plates having a peripheral edge, each of said plates having a hole therein, each of said holes being defined by a perimeter edge, each of said holes extending through said top and bottom sides, each of said peripheral edges having a different size, each of said perimeter edges of said plates having a length substantially equal to one of said peripheral edges of another of said plates;
    a plurality of upstanding members, each of said upstanding members being elongate and having a first end, a second end and a peripheral wall extending between said first and second ends, each of said plates having a plurality of said first ends of said upstanding members integrally coupled thereto;
    a plurality of legs, each of said legs having a distal end and a proximal end, each of said proximal ends having a bore therein, each of said bores having a size adapted for removably receiving one of said upstanding members; and
    a plurality of panels, each of said panels comprising a substantially rigid material, each of said panels having a peripheral edge having a shape generally identical to a shape of a corresponding plate, said peripheral edges of said panels having a length greater than a length of said peripheral edges of said corresponding plate, wherein each of said panels has a different size such that each of said panels is supported by a corresponding plate.

2. The layer cake supporting device as in claim 1, wherein each of said plates has a perimeter edge having a length greater than at least ½ of a length of the peripheral edge.

3. The layer cake supporting device as in claim 2, wherein each of said peripheral edges has a height less than ⅜ inches.

4. The layer cake supporting device as in claim 2, wherein each of said peripheral edges and said perimeter edges has a generally round shape.

5. The layer cake supporting device as in claim 1, wherein each of said peripheral walls of said upstanding members has a threaded surface, wherein each of said plates has four of said upstanding members coupled thereto.

6. The layer cake supporting device as in claim 5, wherein each of said bores in said plurality of legs has a threaded surface adapted for removably coupling with said threaded surface of said upstanding members.

7. The layer cake supporting device as in claim 2, wherein each of said peripheral walls of said upstanding members has a threaded surface, wherein each of said plates has four of said upstanding members coupled thereto.

8. The layer cake supporting device as in claim 7, wherein each of said bores in said plurality of legs has a threaded surface adapted for removably coupling with said threaded surface of said upstanding members such that length between said plates and distal end of said legs may be selectively extended.

9. The layer cake supporting device as in claim 2, wherein a distance between each of said peripheral edges and said perimeter edges is substantially equal to 1 inch.

10. A layer cake supporting device for vertically supporting layers of cake, said device comprising:
    a plurality of plates, each of said plates having a relatively planar top side and a relatively planar bottom side, each of said plates having a peripheral edge, each of said plates having a hole therein, each of said holes extending through said top and bottom sides, said holes each being defined by a perimeter edge having a length greater than at least ½ of a length of the peripheral edge of a same one of said plates, each of said peripheral edges having a different size, each of said perimeter edges of said plates having a length substantially equal to one of said peripheral edges of another of said plates;
    a plurality of upstanding members, each of said upstanding members being elongate and having a first end, a second end, and a peripheral wall extending between said first and second ends, each of said plates having a plurality of said first ends of said upstanding members integrally coupled thereto, said upstanding members being spaced from each other, each of said upstanding members being orientated generally perpendicular to a plane of said bottom sides of said plates;
    a plurality of legs, each of said legs having a distal end and a proximal end, each of said proximal ends having a bore therein, each of said bores having a size adapted for removably receiving one of said upstanding members; and a plurality of panels, each of said panels comprising a substantially rigid material, each of said panels having a peripheral edge having a shape generally identical to a shape of a corresponding plate, said peripheral edges of said panels having a length greater than a length of said peripheral edges of said corresponding plate, wherein each of said panels has a different size such that each of said panels has a corresponding plate;

wherein said legs may be pressed through a top surface of the cake such that said bottom side of said plate rests on the top surface of the cake, wherein a panel may be placed on said top side of said plate such that another layer of cake may be placed on said panel.

11. The layer cake supporting device as in claim 10, wherein said device further comprises:

each of said peripheral edges having a height less than $3/8$ inches, each of said peripheral edges and said perimeter edges having a generally round shape;

each of said peripheral walls having a threaded surface, wherein each of said plates has four of said upstanding members coupled thereto; and each of said bores having a threaded surface adapted for removably coupling with said threaded surface of said upstanding members such that length between said plates and distal end of said legs may be selectively extended, wherein there is a leg for each of said upstanding members.

* * * * *